(12) United States Patent
Mo

(10) Patent No.: US 6,463,448 B1
(45) Date of Patent: Oct. 8, 2002

(54) LINEAR INTRASUMMED MULTIPLE-BIT FEEDBACK SHIFT REGISTER

(75) Inventor: Jiancheng Mo, Allentown, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/409,971

(22) Filed: Sep. 30, 1999

(51) Int. Cl.$^7$ ................................................ G06F 11/00
(52) U.S. Cl. ..................................... 708/252; 714/739
(58) Field of Search ................................. 708/252, 250, 708/251, 253, 256; 714/52, 56, 739, 728, 799

(56) References Cited

U.S. PATENT DOCUMENTS

| | | | | |
|---|---|---|---|---|
| 3,911,330 A | | 10/1975 | Fletcher et al. | 328/37 |
| 4,356,559 A | * | 10/1982 | Candy et al. | 364/724 |
| 5,105,376 A | * | 4/1992 | Pedron | 364/717 |
| 5,309,449 A | * | 5/1994 | Gandini et al. | 371/37.1 |
| 5,446,683 A | * | 8/1995 | Mullen et al. | 364/717 |
| 5,579,337 A | * | 11/1996 | Grinstein et al. | 375/206 |
| 5,612,973 A | * | 3/1997 | Gershenfeld | 375/206 |
| 5,745,522 A | | 4/1998 | Heegard | 375/208 |
| 5,761,239 A | * | 6/1998 | Gold et al. | 375/606 |
| 6,240,432 B1 | * | 5/2001 | Chuang et al. | 708/252 |
| 6,260,173 B1 | * | 7/2001 | Weng et al. | 714/781 |

* cited by examiner

*Primary Examiner*—Nadeem Iqbal

(57) ABSTRACT

A linear intrasummed multiple-bit feedback shift register is presented which comprises a multi-stage multi-bit feedback shift register and further includes an adder situated before the input to each stage and which is used to modify the shifted signals according to predefined constants. The additional intrastage summing increases the complexity of the feedback function and makes it more difficult to determine the specific structure from a limited stream of output bits, thus increasing the security of the circuit.

5 Claims, 2 Drawing Sheets

LINEAR INTRASUMMED MULTIPLE-BIT FEEDBACK SHIFT REGISTER

FIELD OF THE INVENTION

This invention generally relates to the circuitry which generates periodic pseudo-random numbers.

BACKGROUND OF THE INVENTION

A Feedback Shift Register ("FSR") is a circuit element which is used to generate periodic pseudo-random numbers for various applications, such as self-testing circuits, CDMA spread code generating circuit, etc. A sample 5-stage FSR 10 is illustrated in FIG. 1.

As shown, the FSR 10 comprises a sequence of single-bit shift registers 12 connected such that the value of the $i^{th}$ stage at time t equal the value of the previous stage at time t−1. The output of the last stage is combined with the output of one or more intermediate stages with one or more corresponding adders 14 to form a feedback signal 16 which is input to the first stage.

The contents of an FSR can be expressed as a vector $(b_0 b_1 b_2 \ldots b_{n-1})$, where $b_j$ presents the value of i-th stage and the feedback signal 16 equals $c_0 b_0 + c_1 b_1 + \ldots + c_{n-1} b_{n-1}$, where all $c_j$ are constants. In the circuit of FIG. 1, constants $c_0$, $c_2$, and $C_3$ are zero (and hence corresponding adders are not necessary) and the feedback signal 16 equals $b_1 + b_4$. Because the representative equation of the feedback signal is linear, this FSR configuration is called a linear feedback shift register (LFSR). LFSRs are simple to design and have a period which is easy to determine.

A variation on the linear FSR shift register is the linear intrainverted FSR ("IFSR"). This circuit is similar to the FSR but includes an inverter between each stage such that $b_{j+1} = \overline{bj}$ in next cycle. A particular advantage of an IFSR is that it is harder to determine the structure of the feedback arrangement when compared to a linear FSR. If successive 2n−1 output bits are of an n-stage linear FSR are known, the feedback arrangement can be determined. However, substantially more than 2n−1 successive bits must be known to detect the feedback-shift arrangement if some or all the register outputs are inverted and then fed to next stages.

It is also known to provide feedback shift registers where each stage contains more than one bit. Such a linear multiple-bit feedback shift register (MFSR) 20 is illustrated in FIG. 2. The circuit includes a plurality of t-bit registers 22 in which the input of the $i^{th}$ stage at time t is dependent on the value of the previous stage at time t−1. The output of the last stage is summed with the outputs of one or more previous stages using adders 24 to produce a feedback signal 26 which is input to the first stage. In preferred implementations, the extracted intrastage signals are fed to respective multipliers 28 and multiplied by a constant associated with the stage from which the signal is extracted. In this circuit 20 of FIG. 2, the outputs of the last stage and the first two stages are each multiplied by a respective constant and the resultant values summed to produce the feedback signal 26 provided as input to the first stage.

The use of a MFSR permits parallel or low power operation. In data scrambling operations, multiple bits can be scrambled each clock cycle, rather than scrambling one bit per time. Alternatively, power can be saved if only one random bit is needed in each cycle since a MFSR shifts out multiple bits in each cycle and thus an mt-bit wide MSFR will only need to be clocked every m cycles. However, the MFSR shares many disadvantages with binary LFSR, such as low hardware testability, low security etc.

Accordingly, it would be advantages to provide a modified MSFR which has at least the same period as a conventional MSFR but requires a longer sequence of bits to determine the feedback function, and therefore, is more secure.

SUMMARY OF THE INVENTION

According to the invention, a Linear Intrasummed Multiple-bit Feedback Shift Register (LIMFSR) is presented. The configuration of the LIMFSR circuit is similar to a multiple feedback shift register but further includes an adder situated before the input to each stage and which is used to modify the shifted signals by predefined constants. This additional intrastage summing increases the complexity of the feedback function and makes it more difficult to determine the specific structure from a limited stream of output bits, thus increasing the security of the circuit. The particular values of the intrasummed constants needed for specific implementations of the LIMFSR circuit can be determined in accordance with a technique based on finite field theory.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 3:
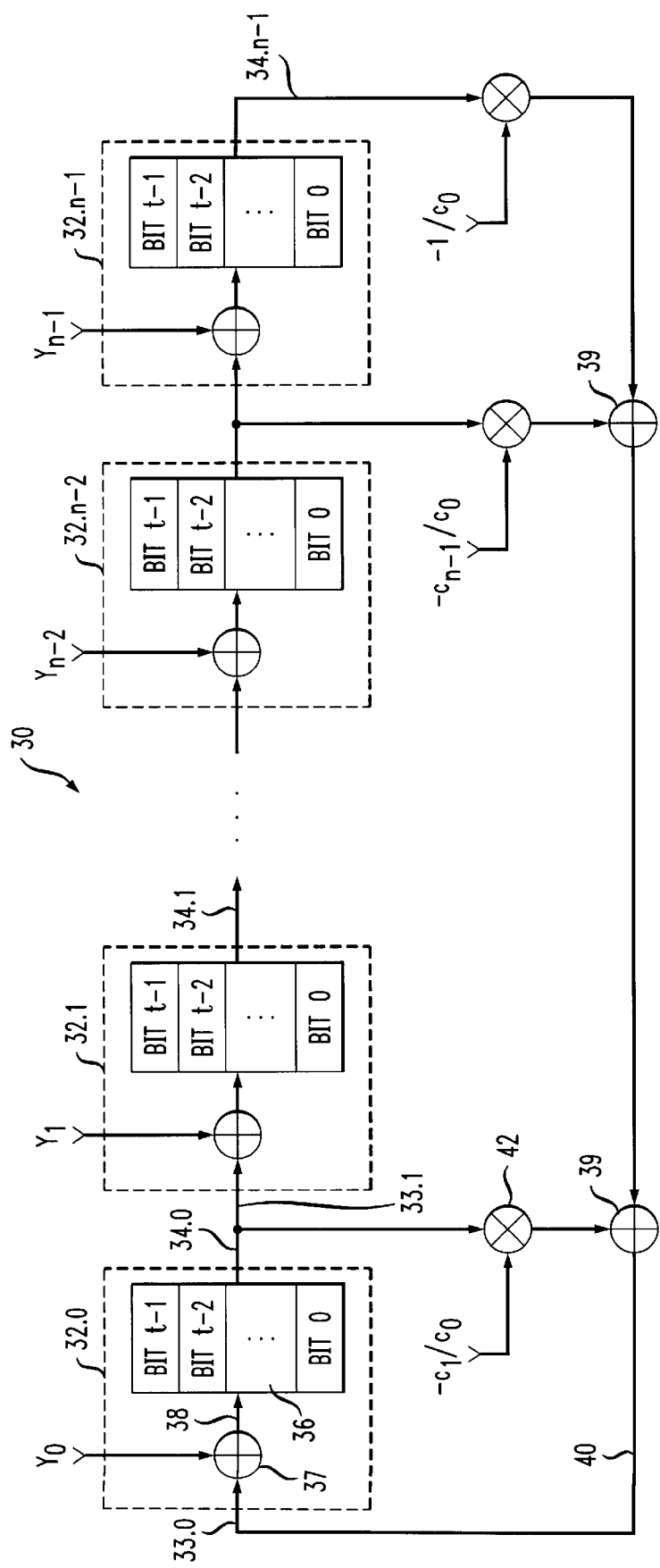
FIG. 3 is a block diagram of a linear intrasummed multiple-bit feedback shift register according to the invention.

FIG. 3 is a block diagram of a linear intrasummed multiple-bit feedback shift register 30. The circuit 30 comprises n stages 32.i, 0<i<n−1 each having an input 33.i and an output 34.i. Each stage 32 comprises a t-bit register 36 and an adder 37. The adder combines the input 33 and a predefined constant $Y_i$ which is associated with the particular stage 32 to produces an intermediate signal 38. The intermediate signal 38 is loaded into the register 36 during the next clock cycle.

The output 34.i of each stage except the last is connected directly to the input 33.i+1 of the subsequent stage. The output 34.n−1 of the last stage is summed with the outputs of one or more previous stages using summers 39 to produce a feedback signal 40 which is input to the first stage. The output signals which are combined to generate the feedback signal 40 are preferably fed to respective multipliers 42 and multiplied by a constant associated with the stage from which the signal is extracted before being input to the respective summer 39. The circuit 30 may be formed from discrete components. Preferably, however, the circuit 30 is implemented as an integrated circuit which may be combined with other circuit elements on a single chip. In addition, while summers 39 are shown as separate elements, it is understood that one summer having more than two inputs can be used instead.

Figure 2:
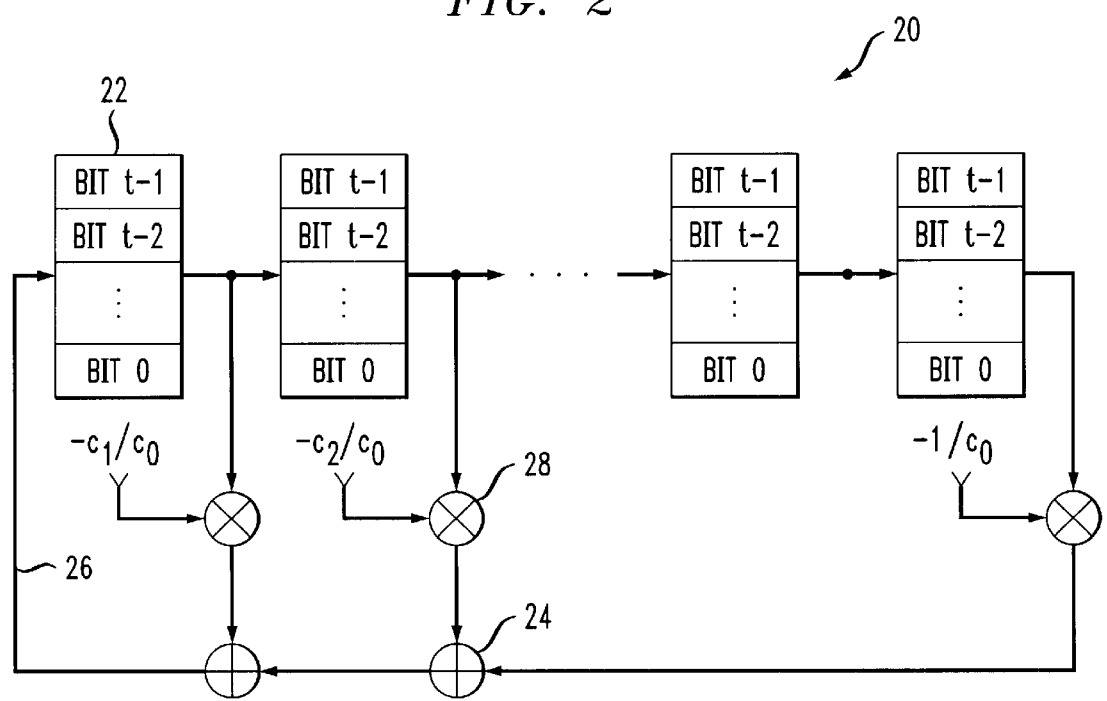
FIG. 2 is a block diagram of a conventional multiple-bit feedback shift register.

The use of the intrastage adders 37 to modify the shifted values increases the number of parameters which must be determined by a party analyzing the output of the circuit 30 before they can deduce the structure of the circuit itself. In particular, successive 3n−1 output numbers must be known to generate the 2n linear equations needed to determine the specific structure of a particular implementation of the circuit 30. In contrast, the structure of a conventional MFSR, such as shown in FIG. 2, can be deduced with only 2n−1 successive outputs. Therefore, the circuit 30 of the invention provides increases security when used in data scrambling applications.

The determination of the specific values for the feedback and intrastage constants requires reference to finite field theory. As known to one of skill in the art, each finite field $GF(p^n)$ has an associated primitive polynomial defined as $$\alpha^n + \sum_{i=1}^{n-1} c_i \cdot \alpha^i + c_0, c_0 \neq 0. \quad \text{(Equ. 1)}$$

Every element e of finite field $GF(p^n)$ can be expressed as $$\sum_{i=0}^{n-1} e_j \cdot \alpha^i,$$

where α is the primitive element. Every element e can also be expressed in dual base as:

$$\sum_{i=0}^{n-1} b_j \cdot \beta_j \langle \beta_0, \beta_1, \beta_2 \ldots \beta_{n-1} \rangle \quad \text{(Equ. 2)}$$

Figure 1:
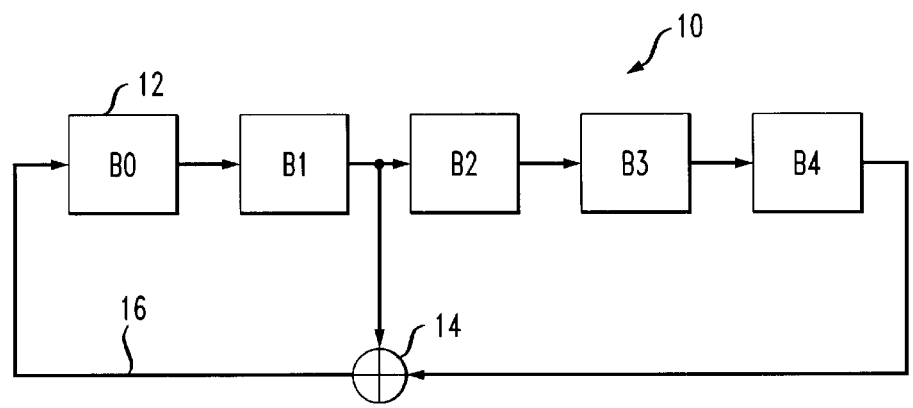
FIG. 1 is a block diagram of a conventional linear feedback shift register.

Using the primitive polynomial of $GF(p^n)$ and its dual base, a MSFR circuit, such as shown in FIG. 2, can be designed, where the i-th stage presents $b_j$, and the feedback function is determined by the primitive polynomial. If and only if $c_j$ is not zero, the output of i-th stage is multiplied by $-c_{j+1}/c_0$, then summed (inside a finite field) with the multiplication of the output of the last stage and $-1/c_0$. The generated sequence has a period $p^n-1$, containing all the elements in $GF(p^n)$ except 0. It is linear multiple-bit feedback shift register. When p=2, the circuit reduces to a binary LFSR, such as shown in FIG. 1

As shown in FIG. 3, in the circuit of the invention, the input to the i-th stage is summed with a constant $Y_j$, $0<=Y_j<p$ for all i. For an n-stage circuit where each stage has t bits, the feedback arrangement to produce the maximum cycle length is determined by the primitive polynomial defined as:

$$GF(p^n) = \alpha^n + \sum_{i=1}^{n-1} c_i \cdot \alpha^i + c_0(c_0 \neq 0) \quad \text{(Equ. 3)}$$

If $c_i$ is not zero, the output of i-th stage is multiplied by $-c_{i+1}/c_0$, then summed with the multiplication of the output of the last stage by $-1/c_0$ and further summed with $Y_0$ when fed back to the first stage. Stated another way, the feedback function is:

$$f = \sum_{i=1}^{n-1} -c_i \cdot b_i / c_0 \quad \text{(Equ. 4)}$$

where $b_i$ is the output of i-th stage. Since the feedback function is still linear and the output of each stage is "intrasummed" when input to the following stage, this FSR is called Linear Intrasummed Multiple-bit Feedback Shift Register (LIMFSR). As will be recognized by those of skill in the art, p can be any number which is a prime power number. However, the most efficient design is $p=2^t$ to fully utilize the register array.

The specific cyclic behavior of the LIMFSR circuit 30 according to the invention is very complicated to predict. However, several design principles have been determined which are sufficient to design specific instances of the circuit 30. These principles are detailed below.

The next state value of the various stages in the circuit 30 can be predicted using the current state, the feedback function, and the intrastage constants. For an LIMFSR is designed on $GF(p^n)$, if the value presented by the current cycle is $$v = \sum_{i=0}^{n-1} b_j \cdot \beta_j,$$

where $b_j$ is i-th stage value, and the value presented by next cycle is $$v' = \sum_{i=0}^{n-1} b'_j \cdot \beta_j,$$

the following relationships are true:

$$v' = v \cdot \alpha + \sum_{i=0}^{n-1} Y_i \cdot \beta_i \quad \text{(Equ. 5)}$$

and $$b_0 = Y_0 - b_{n-1}/c_0 + \sum_{i=0}^{n-1} -c_{i+1} \cdot b_i / c_0 \quad \text{(Equ. 7)}$$

where 0<i<n.

In addition, it can be shown that if the LIMFSR is designed on $GF(p^n)$, the period of the pseudo-random number sequence is $p^n-1$. This is the same period as for a conventional MFSR designed on $GF(p^n)$. Thus, the security of the circuit is increased without reducing the period. The resulting periodic number sequence for the LIMFSR contains all of the numbers in $GF(p^n)$ except one, which can be calculated as:

$$\frac{\alpha \sum_{i=0}^{n-1} Y_j \cdot \beta_j}{\alpha - 1} \quad \text{(Equ. 8)}$$

Utilizing general design principles for feedback shift registers, and the specific principles specified in Equations 5–8, one of skill in the art can implement a specific LIMFSR by (1) selecting the primitive polynomial to determine the feedback function, (2) selecting the parameters $Y_0-Y_{n-1}$ in accordance with the desired circuit operation, and (3) initializing the circuit to any number except the one specified in Equation 7.

In addition to an increase in security, the LIMFSR 30 of the invention also has improved usefulness in testability. For example, in an LIMFSR 30 built on $GF(4^n)$, each stage has two bits, the constants $Y_0-Y_{n-1}$ can each be set to equal "3." Note that in GF(4), 3+0=3, and 3+3=0. To detect and locate a specific register which is stuck at zero, all of the registers are first reset to 0s, then shifted out serially in cycles. Because each stage has two bits, two bits are shifted out in each cycle. The position where the serial output produces continues 1s can be used to detect the location of the faulty register. Similarly, to detect stuck-at-1 faults, LIMFSR is first set to all 1s then shifted out serially.

Although preferred embodiments of the invention have been disclosed for illustrative purposes, those skilled in the art will appreciate that many additions, modifications and substitutions are possible, without departing from the scope and spirit of the invention as defined by the accompanying claims. Preferably, all components are digital. However, those components may be analog and/or digital.

I claim:

1. A linear intrasummed multiple-bit feedback shift register comprising:
   a plurality of stages, each stage having an input and an output, the input of each stage except a first stage being connected to the output of a subsequent stage, each stage comprising:
      an adder receiving the respective input and a predefined constant and producing an intermediate sum; and
      a multibit register connected to the adder and constructed to load the intermediate sum in response to a clock signal, the contents of the register forming the respective output; and
   at least one summer receiving the output of a last stage and the output of at least one other stage and combining these outputs to produce a feedback signal;
   the first stage receiving the feedback signal as input.

2. A linear intrasummed multiple-bit feedback shift register comprising:
   a plurality of stages, each stage having an input and an output, the input of each stage except a first stage being connected to the output of a subsequent stage, each stage comprising:
      an adder receiving the respective input and a predefined constant and producing an intermediate sum; and
      a multibit register connected to the adder and constructed to load the intermediate sum in response to a clock signal, the contents of the register forming the respective output;
   a first multiplier receiving the output of a last stage and a first multiplier constant as input and producing a first multiplier output;
   at least one additional multiplier, each receiving the output of a respective intermediate stage and a respective multiplier constant as input and producing a respective additional multiplier output;
   a summing circuit comprising one or more summers and receiving the first multiplier output and the at least one additional multiplier output as inputs and producing the feedback signal as output;
   the first stage receiving the feedback signal as input.

3. A linear intrasummed multiple-bit feedback shift register comprising:
   a plurality of stages, each stage having an input and an output, the input of each stage except a first stage being connected to the output of a subsequent stage;
   each stage comprising a multibit register connected between the respective input and output, the contents of the register forming the respective output;
   at least one stage further comprising an adder connected between the respective input and the multibit register, the adder combining the respective input and a predefined constant and producing an intermediate sum, the multibit register receiving the intermediate sum as input;
   a first multiplier receiving the output of a last stage and a first multiplier constant as input and producing a first multiplier output;
   at least one additional multiplier, each receiving the output of a respective intermediate stage and a respective multiplier constant as input and producing a respective additional multiplier output;
   a summing circuit comprising one or more summers and receiving the first multiplier output and the at least one additional multiplier output as inputs and producing the feedback signal as output;
   the first stage receiving the feedback signal as input.

4. In a feedback shift register comprising a plurality stages each having an input and an output and including a multi-bit register connected between the input and output, the input of each stage except a first stage being connected to the output of a subsequent stage, the output of a last stage and the output of at least one other stage being combined to produce a feedback signal, the first stage receiving the feedback signal as input, the improvement comprising:
   an adder in each stage situated between the input and the register, each adder combining the respective input and a respective constant to produce an intermediate sum, the multibit register connected to the adder and constructed to load the intermediate sum in response to a clock signal, the contents of the register forming the output.

5. An integrated circuit including a linear intrasummed multiple-bit feedback shift register, the shift register comprising:
   a plurality of stages, each stage having an input and an output, the input of each stage except a first stage being connected to the output of a subsequent stage;
   each stage comprising a multibit register connected between the respective input and output, the contents of the register forming the respective output;
   at least one stage further comprising an adder connected between the respective input and the multibit register, the adder combining the respective input and a predefined constant and producing an intermediate sum, the multibit register receiving the intermediate sum as input;
   a first multiplier receiving the output of a last stage and a first multiplier constant as input and producing a first multiplier output;
   at least one additional multiplier, each receiving the output of a respective intermediate stage and a respective multiplier constant as input and producing a respective additional multiplier output;
   a summing circuit comprising one or more summers and receiving the first multiplier output and the at least one additional multiplier output as inputs and producing the feedback signal as output;
   the first stage receiving the feedback signal as input.

* * * * *